United States Patent [19]
Takeuchi et al.

[11] Patent Number: 4,856,177
[45] Date of Patent: Aug. 15, 1989

[54] AUTOMATIC TOOL CHANGER WITH ELECTROMAGNETICALLY READABLE TOOL HOLDER HAVING AN ELECTROMAGNETICALLY COUPLING STOPPER FOR NUMERICAL CONTROL

[75] Inventors: Kunihiko Takeuchi, Kawasaki; Masao Oba, Yokohama; Shinichi Horinouchi, Tokyo, all of Japan

[73] Assignee: Tokyo Keiki Company Ltd., Tokyo, Japan

[21] Appl. No.: 152,419

[22] Filed: Feb. 4, 1988

[30] Foreign Application Priority Data

Feb. 10, 1987 [JP] Japan .................................. 62-29389

[51] Int. Cl.⁴ ............................................. B23Q 3/00
[52] U.S. Cl. ...................................... 29/568; 40/913; 279/1 TS; 409/234; 365/66
[58] Field of Search .................. 29/568; 279/1 TS; 409/234; 365/63, 64, 65, 66; 40/913

[56] References Cited
U.S. PATENT DOCUMENTS

| | | | |
|---|---|---|---|
| 3,173,204 | 3/1965 | Anthony | 29/568 |
| 4,014,275 | 3/1977 | Herr et al. | 365/170 X |
| 4,404,559 | 9/1983 | Renner | 340/870.28 |
| 4,449,206 | 5/1984 | Tokitsu et al. | 365/229 |
| 4,588,339 | 5/1986 | Bilz | 409/234 |
| 4,635,328 | 1/1987 | Palmer | 29/568 |
| 4,720,907 | 1/1988 | Rapp | 29/568 |
| 4,742,470 | 5/1988 | Juengel | 364/474 |

FOREIGN PATENT DOCUMENTS

| | | | |
|---|---|---|---|
| 0111693 | 6/1984 | European Pat. Off. | 29/568 |
| 0155662 | 9/1985 | European Pat. Off. | 29/568 |
| 3611447 | 10/1987 | Fed. Rep. of Germany | 409/234 |

Primary Examiner—Rodney B. Bovernick
Assistant Examiner—R. D. Shafer
Attorney, Agent, or Firm—Wenderoth, Lind & Ponack

[57] ABSTRACT

A tool holder is enclosed in a rack which is moved by a belt for automatic tool exchange. A stopper member provided for the rack is fitted into a positioning groove formed in a flange portion of the tool holder, thereby preventing the rotation of the holder. A magnetic induction coupling apparatus is buried in the bottom of the tool holder positioning groove. A magnetic induction coupling apparatus of a reader/writer disposed at the external position is arranged so as to face the magnetic induction coupling apparatus of the tool holder. Information is written into or read out of a memory module attached in the tool holder by way of the magnetic induction coupling between both of those coupling apparatuses. The stopper member of the rack is arranged between the magnetic induction coupling apparatus of the tool holder and the magnetic induction coupling apparatus of the reader/writer and has a magnetic material to magnetically couple these coupling apparatuses.

4 Claims, 6 Drawing Sheets

FIG. 4
PRIOR ART
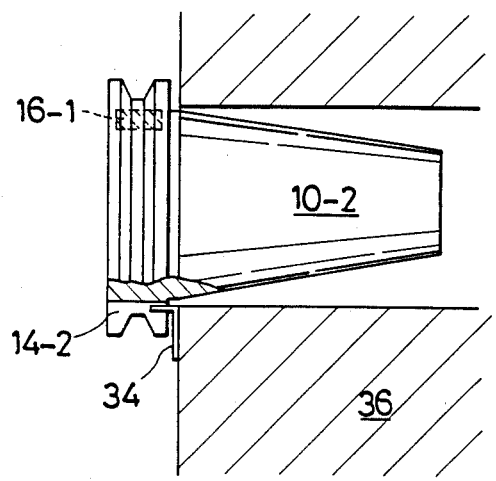
FIG. 5A
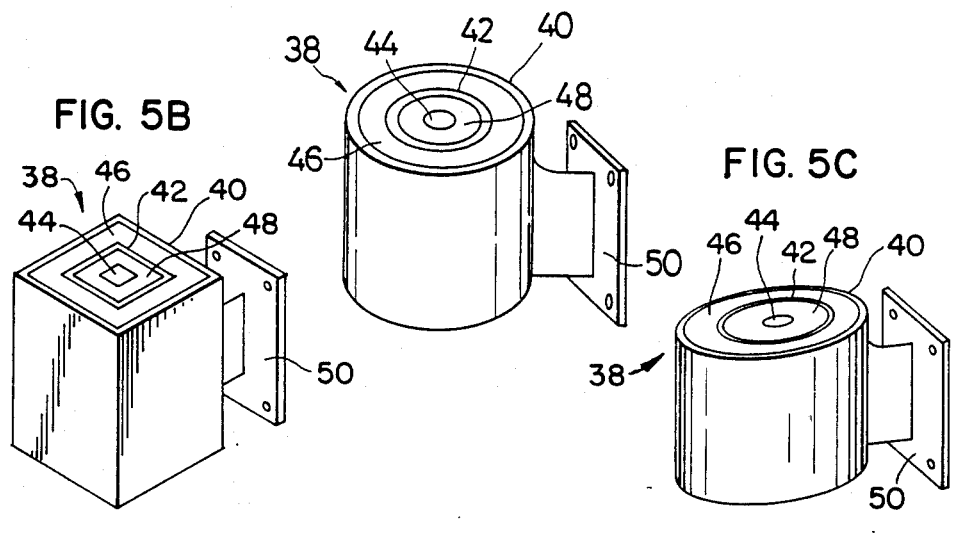
FIG. 5B
FIG. 5C

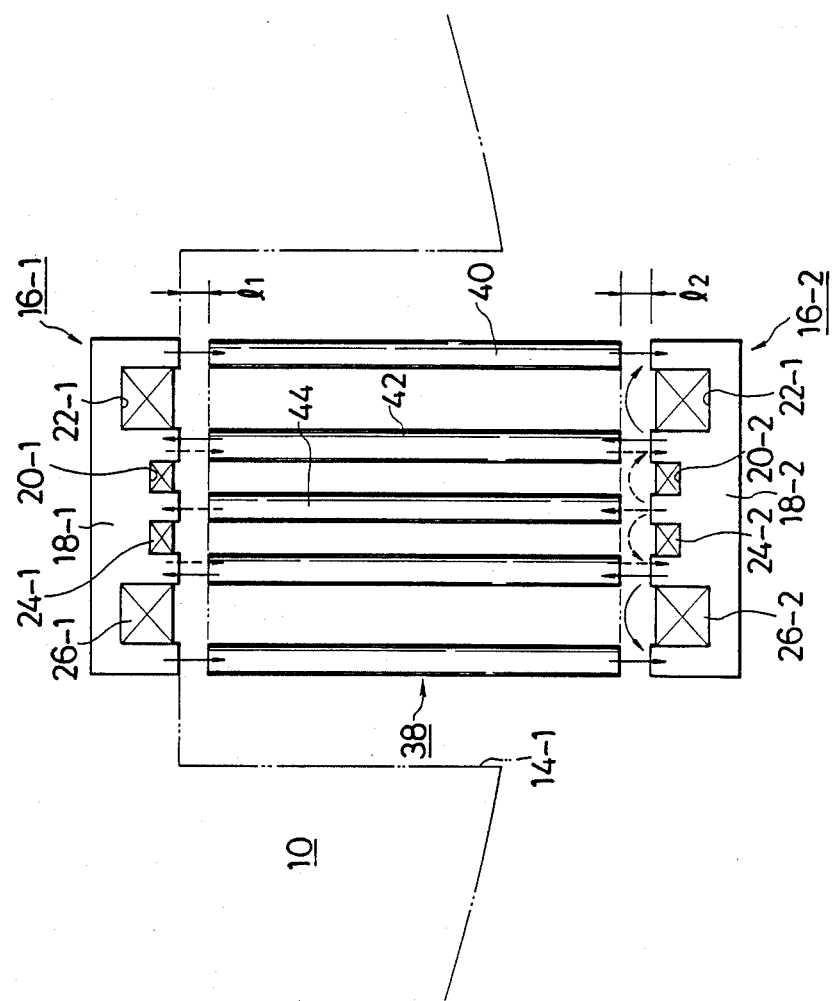

AUTOMATIC TOOL CHANGER WITH ELECTROMAGNETICALLY READABLE TOOL HOLDER HAVING AN ELECTROMAGNETICALLY COUPLING STOPPER FOR NUMERICAL CONTROL

BACKGROUND OF THE INVENTION

The present invention relates to an automatic tool changer for automatically exchanging a tool to a machine tool such as a machining center or the like by use of a tool holder having therein a memory module to store information such as size, use time, and the like of a tool and, more particularly, to an automatic tool changer having a magnetic induction coupling apparatus for transmitting a signal between a holder and a reader/writer by a magnetic induction coupling.

As a tool holder which is used in an automatic tool changer, in U.S. Pat. Application No. 06/924,342, entitled "INFORMATION PROCESSING APPARATUS OF TOOL," and filed Oct. 24, 1986 by the inventor, and now U.S. Pat. No. 4,809,426 there is disclosed a tool holder in which a memory module is provided in the tool holder so that the holder itself has various kinds of information necessary for tool change and tool management, such as numbers, use times, and the like of the tools attached to the tool holder, and a power source is supplied from an external reader/writer to the tool holder and at the same time, data is written into or read out of the tool holder by a contactless method owing to a magnetic induction coupling.

FIGS. 1A and 1B show an example of a state in which a magnetic induction coupling apparatus for contactless data transmission is attached to a tool holder.

In FIGS. 1A and 1B, reference numeral 10 denotes a tool holder. A flange portion 14 is formed subsequent to a tapered shaft portion 12. Positioning grooves 14-1 and 14-2 are formed at two positions in the periphery of the flange portion 14. A magnetic induction coupling apparatus 16-1 is buried into a bottom portion of the positioning groove 14-1.

As shown in FIG. 2A, the magnetic induction coupling apparatus 16-1 of the tool holder 10 has a structure such that two coil grooves 20-1 and 22-1 are coaxially formed so as to open in the edge surface of a disc-shaped magnetic core 18-1 made of ferrite or the like, and induction coils 24-1 and 26-1 are wound in 15 the coil grooves 20-1 and 22-1, respectively. FIG. 2B shows a plan view of the side of a magnetic pole surface of the magnetic induction coupling apparatus 16-1 in FIG. 2A.

A magnetic induction coupling apparatus 16-2 of a reader/writer which is disposed in the outside is arranged so as to face the magnetic induction coupling apparatus 16-1 through a gap l. The magnetic induction coupling apparatus 16-2 of the reader/writer also has a structure such that induction coils 24-2 and 26-2 are wound in coil grooves 20-2 and 22-2 formed in a magnetic core 18-2 in a manner similar to the coupling apparatus 16-1.

However, the tool holder 10 with such a structure that the magnetic induction coupling apparatus 16-1 is buried in the bottom portion of the positioning groove 14-1 has the following problems. Namely, the magnetic core 16-1 and induction coils 24-1 and 26-1 cannot be made relatively large because of the dimensional limitation of the positioning groove of the tool holder 10, the electromagnetic inductive force attenuates in reverse proportion to almost the cube of a contactless transfer distance, and the like. From these reasons, the contactless transfer distance when a pair of magnetic induction coupling apparatuses 16-1 and 16-2 are disposed so as to face as shown in FIG. 2A is set to at most about 4 mm.

On the other hand, for example, in the case of a BT 50 tool holder based on the MAS standard, depths of positioning grooves 14-1 and 14-2 in the tool holder 10 are set to 14.6 mm from the outer periphery of the flange portion 14. Therefore, even if the magnetic induction coupling apparatus 16-2 of the reader/writer is disposed so as to face the magnetic induction coupling apparatus 16-1 of the holder 10 from the outside of the flange in the tool holder 10, data cannot be written into and read out of the memory module.

In the conventional automatic tool changer, as shown in FIGS. 3 and 4, tool holders 10-1, 10-2, 10-3, . . . are enclosed in racks 36-1, 36-2, 36-3, . . . of the automatic tool changer by fitting each rotation preventing stopper 34 into each positioning groove 14-2, respectively. Therefore, the magnetic induction coupling apparatus 16-2 of a reader/writer 28 is attached to the magnetic induction coupling apparatus 16-1 of the tool holder 10-2 which has moved to a predetermined writing/reading position in a manner such that the coupling apparatus 16-2 can be freely lifted up and down by an air cylinder 30 which is controlled by an air valve 32. Given to this, the following processes are executed.

(I) A desired tool holder, e.g., the tool holder 10-2 of FIGS. 3 and 4 is moved and stopped just under the air cylinder 30.

(II) After confirming that the tool holder 10-2 has been stopped, the air valve 32 is turned on to lift down the air cylinder 30.

(III) The magnetic induction coupling apparatus 16-2 is allowed to approach the magnetic induction coupling apparatus 16-1 of the tool holder 10-2 b the descent of the air cylinder 30. After confirming that both magnetic induction coupling apparatuses are located within a predetermined distance, data is written or read out. (IV) After completion of the data writing or reading operations, the air cylinder 30 is lifted up. After confirming the ascent of the air cylinder 30, the movement of the next tool holder is started.

Further, to realize the operations in the above items (I) to (IV), an elevating mechanism having the air cylinder 30 and air valve 32 must be provided for the automatic tool changer. On the other hand, prior to writing or reading data, it is necessary to execute a preparing operation to position the magnetic induction coupling apparatuses, so that the processing time becomes long. Thus, there are problems such that the structure of the mechanism becomes complicated, the cost increases, and reliability is lacking as the magnetic induction coupling apparatus is frequently lifted up and down.

SUMMARY OF THE INVENTION

It is an object of the present invention to provide an automatic tool changer in which a magnetic induction coupling apparatus of a reader/writer can be disposed so as to face a magnetic induction coupling apparatus of a tool holder at an enough distance away from each other.

Another object of the invention is to provide an automatic tool changer in which by merely arranging a magnetic induction coupling apparatus of a reader/writer from the outside of the outer periphery of a flange of a tool holder so as to face the tool holder, a power source can be supplied to a memory module of the tool holder and data can be written into or read out of the memory module.

Still another object of the invention is to provide an automatic tool changer in which a magnetic member to transfer an induction field is arranged between a magnetic induction coupling apparatus of a tool holder and a magnetic induction coupling apparatus of a reader/writer.

Still another object of the invention is to provide an automatic tool changer in which a magnetic member to transfer an induction field is arranged between two magnetic induction coupling apparatuses integrally with a stopper member of a rack.

Namely, the invention relates to an automatic tool changer in which a tool holder is enclosed in a rack in a state in which a stopper member is fitted into a positioning groove formed in a flange portion of the tool holder.

In the tool holder, the magnetic induction coupling apparatus is buried in the bottom portion of the positioning groove formed in the flange portion, and this tool holder has therein a memory into and from which data is written or read out by a contactless method by this magnetic induction coupling apparatus with the magnetic induction coupling apparatus of the reader/writer.

The stopper member to stop the rotation of the tool holder enclosed in the rack has a multi-layer annular structure which is obtained by coaxially arranging a plurality of cylindrical or rod-shaped magnetic materials each having a circular, rectangular, or elliptic shape or the like in accordance with the core edge shape of the magnetic induction coupling apparatus. One end of the stopper member is arranged so as to face the magnetic induction coupling apparatus buried in the bottom portion of the positioning groove of the tool holder and the other end is arranged so as to face the magnetic induction coupling apparatus of an external apparatus.

Therefore, the stopper member for stopping the rotation of the tool holder and for positioning this holder is interposed between the magnetic induction coupling apparatus of the tool holder and the magnetic induction coupling apparatus of the external reader/writer, thereby magnetically coupling them.

Thus, by merely fixing the magnetic induction coupling apparatus on the reader/writer side to the outside of the outer periphery of the flange of the tool holder without elevating this coupling apparatus, the power supply and data writing and reading operations can be performed by a contactless method with the magnetic induction coupling apparatus of the holder positioning groove which is located at a distance. On the other hand, as no movable portion exists, the reliability is high and, further, data can be written or read out while moving the tool holder. Moreover, as it is sufficient that the stopper member is formed in a magnetic transfer shape adapted to the magnetic pole surface of the magnetic induction coupling apparatus, the cost can be reduced.

The above and other objects, features, and advantages of the present invention will become more apparent from the following detailed description in conjunction with the accompanying drawings.

BRIEF DESCRIPTION OF THE DRAWINGS

FIG. 4 is a cross sectional explanatory diagram of a writing/reading position in FIG. 3;

FIG. 5 is an explanatory diagram showing an embodiment of a stopper member which is used in the invention;

FIG. 9 is an explanatory diagram showing the magnetic induction coupling operation using the stopper member of FIG. 5.

DETAILED DESCRIPTION OF THE PREFERRED EMBODIMENT

FIG. 5 is an explanatory diagram showing an embodiment of a stopper member for a tool holder in an automatic tool changer of the present invention.

Figure 1A:
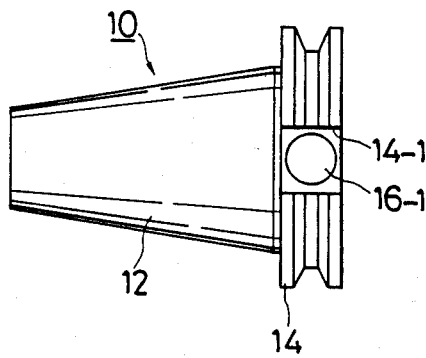
FIG. 1A is a side elevational view of a tool holder having a magnetic induction coupling apparatus.
Figure 1B:
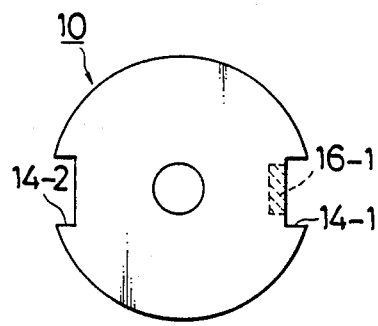
FIG. 1B is a front view of the tool holder.
Figure 2A:
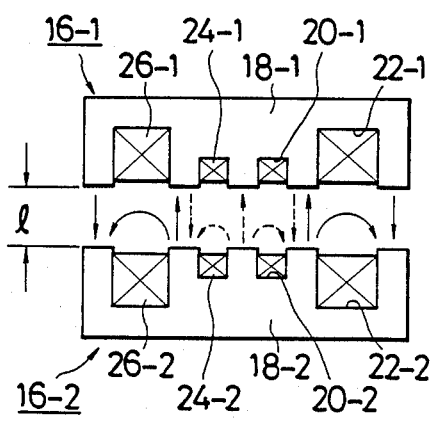
FIG. 2A is an explanatory diagram showing an arrangement of the tool holder and a magnetic induction coupling apparatus of a reader/writer.
Figure 2B:
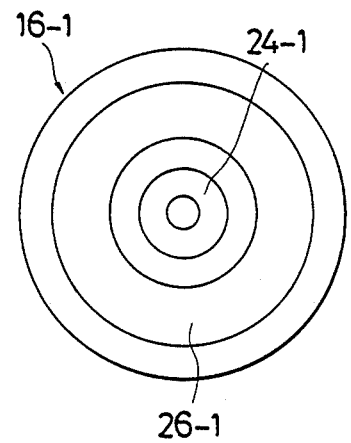
FIG. 2B is a plan view of a magnetic pole surface of the magnetic induction coupling apparatus of the tool holder in FIG. 2A.
Figure 3:
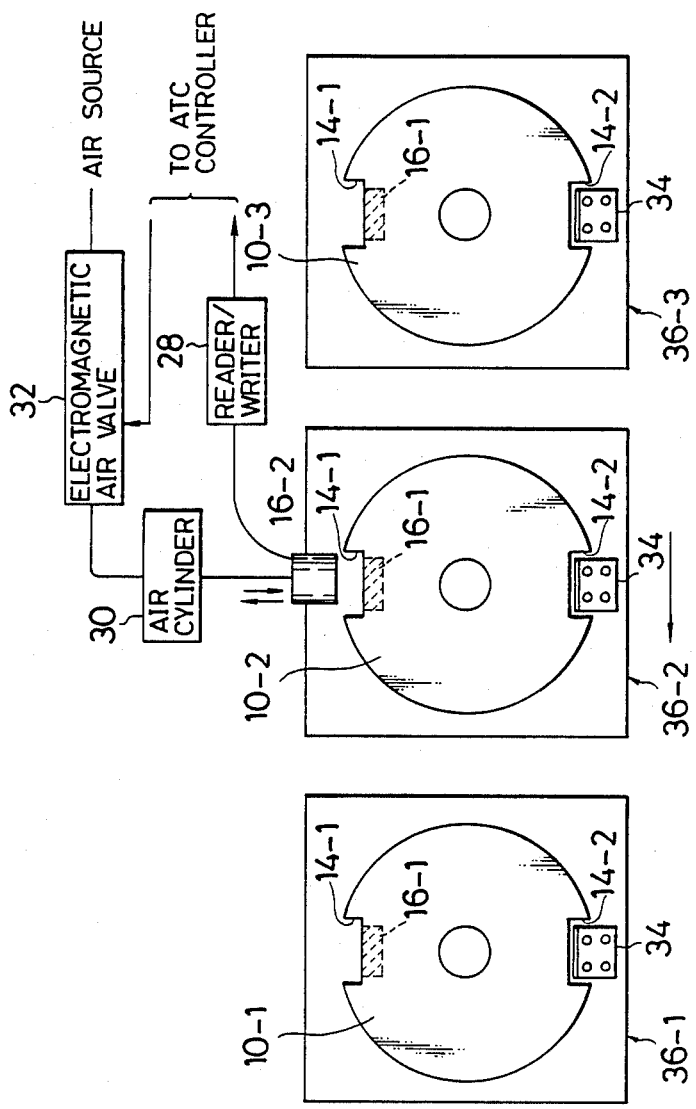
FIG. 3 is an explanatory diagram showing the writing/reading operations of a conventional automatic tool changer.

In FIG. 5, when considering the magnetic induction coupling apparatus with the structure shown in, e.g., FIG. 2A, a stopper member 38 has a multi-layer annular structure in which a pipe 40 made of ferrite having the same cross sectional shape as an outer peripheral core, a ferrite pipe 42 having the same cross sectional shape as a intermediate core, and a ferrite cylinder 44 having the same cross sectional shape as the central core are respectively coaxially arranged. Nonmagnetic material layers 46 and 48 each consisting of plastics or the like are filled in the spaces between the outer peripheral pipe 40 and the intermediate pipe 42 and between the intermediate pipe 42 and the central cylinder 44, respectively. Further, an attaching member 50 is integrally attached to the outer peripheral pipe 40 in order to fixedly attach the stopper member 38 to a rack enclosing portion of the automatic tool changer.

Figure 6:
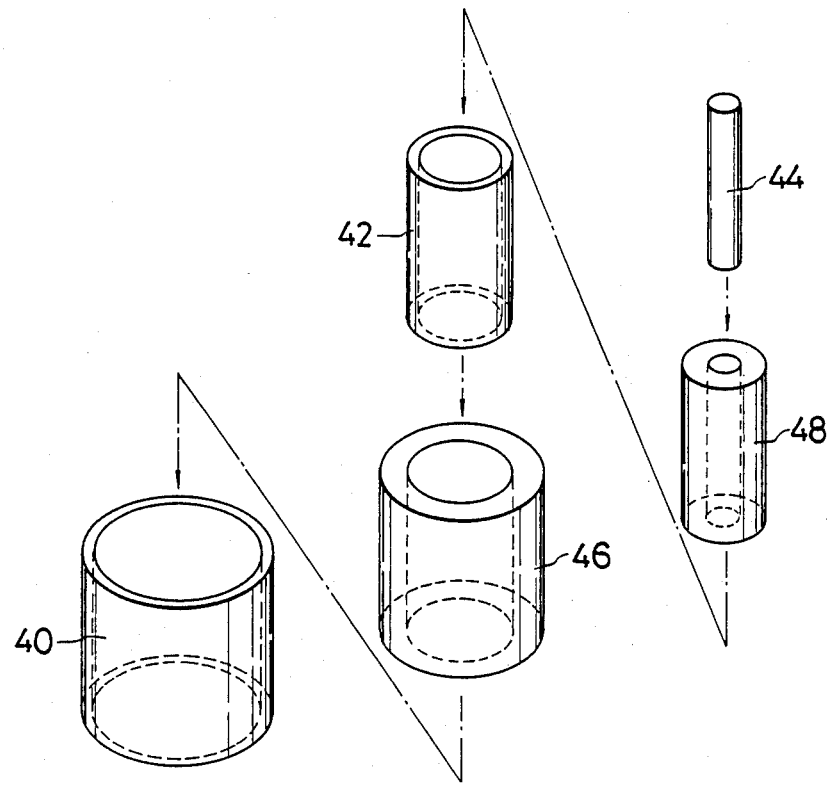
FIG. 6 is an exploded assembly diagram of the stopper member in FIG. 5.

FIG. 6 is an exploded assembly diagram of the stopper member 38 shown in FIG. 5. The intermediate ferrite pipe 42 is inserted into the outer peripheral pipe 40 made of ferrite through the nonmagnetic material layer 46 consisting of plastics or the like. The central ferrite cylinder 44 is inserted into the intermediate ferrite pipe 42 through the nonmagnetic material layer 48 consisting of plastics or the like.

As shown in the exploded assembly diagram of FIG. 6, the stopper member shown in FIG. 5 may have a structure such that the ferrite pipes 40 and 42, ferrite cylinder 44, and nonmagnetic material layers 46 and 48 consisting of plastics or the like are individually molded and respectively coaxially assembled. Or, it is also possible to constitute in a manner such that the ferrite pipes 40 and 42 and cylinder 44 are coaxially arranged and thereafter, the nonmagnetic material layers 46 and 48 are filled by performing the injection molding using plastics.

Figure 7:
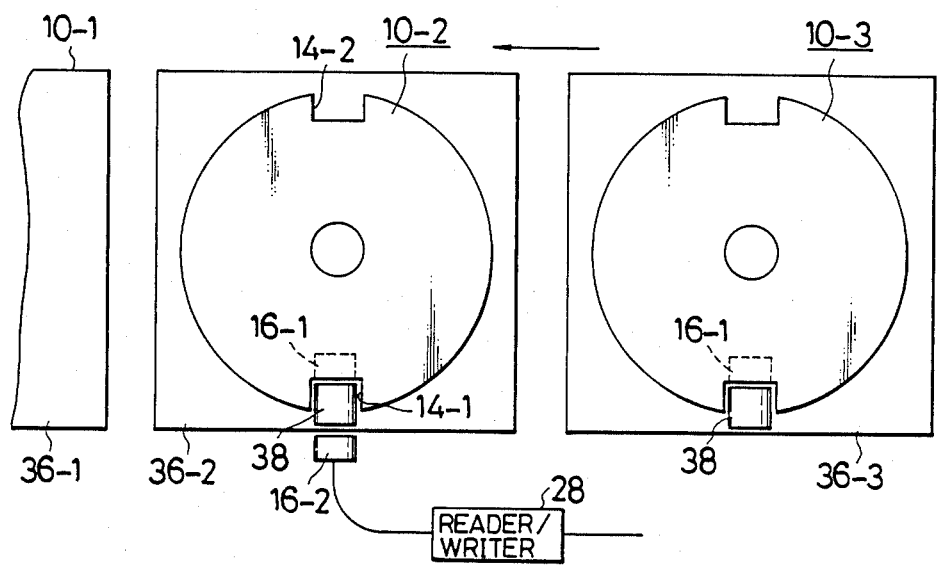
FIG. 7 is an explanatory diagram showing an enclosing state of a tool holder in an automatic tool changer using the stopper member of FIG. 5.

FIG. 7 is a explanatory diagram showing an enclosing state of the tool holder to a rack of the automatic tool changer having the stopper member 38 shown in FIGS. 5 and 6.

In FIG. 7, a plurality of racks 36-1, 36-2, 36-3, ... are enclosed in the tool holders 10-1, 10-2, 10-3, ..., respectively. When looking at the rack 36-1 locating at the writing/reading position, the tool holder 10-2 is formed with the positioning grooves 14-1 and 14-2 at two positions of the flange portion. As shown by a broken line, the magnetic induction coupling apparatus 16-1 is buried into the bottom portion of the positioning groove 14-1.

Figure 8:
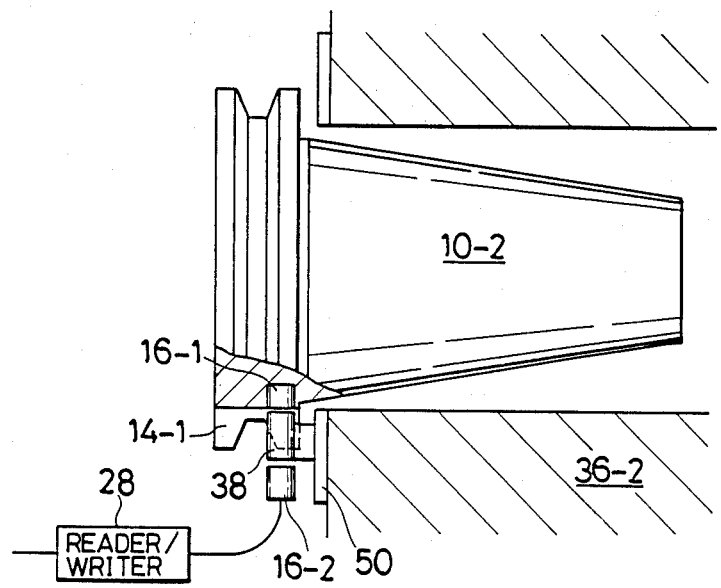
FIG. 8 is a cross sectional explanatory diagram of the writing/reading position in FIG. 7.

The stopper member 38 shown in FIG. 5 is fixed to the lower portion of, e.g., the rack 36-2 by the attaching member 50 as illustrated in FIG. 8. The positioning groove 14-1 on the side in which the magnetic induction coupling apparatus 16-1 of the tool holder 10-2 is buried is fitted into the stopper member 38, thereby preventing the rotation of the tool holder 10-2 in the state in which the tool holder was enclosed in the rack.

Further, the magnetic induction coupling apparatus 16-2 of the reader/writer 28 is fixed to the position on the outside which faces the stopper member 38 fixed to each of the racks 36-1, 36-2, 36-3, ... which are moved by a belt. Therefore, the magnetic induction coupling apparatus 16-1 of the tool holder 10-2 is arranged so as to face the magnetic induction coupling apparatus 16-2 on the side of the reader/writer 28 through the stopper member 38. The power supply and data writing/reading operations are executed to the memory module provided in the tool holder 10-2 by way of the contactless magnetic induction coupling.

The operation of the present invention will now be explained.

FIG. 9 is an explanatory diagram showing enlargedly a state in which the magnetic induction coupling apparatuses 16-1 and 16-2 are disposed so as to face each other through the stopper member 38 as shown in FIGS. 7 and 8. The magnetic induction coupling apparatus 16-1 is buried in the bottom portion of the positioning groove 14-1 of the tool holder 10. The coupling apparatus 16-1 is constituted in a manner such that two coil grooves 20-1 and 22-1 are formed so as to open in one end of the disc-shaped magnetic core 18-1 and the induction coils 24-1 and 26-1 ar wound in the coil grooves 20-1 and 22-1.

The magnetic induction coupling apparatus 16-2 on the reader/writer side is disposed in the outside of the outer periphery of the flange in which the positioning groove 14-1 is formed. A distance between the coupling apparatus 16-2 and the magnetic induction coupling apparatus 16-1 on the holder side is set to ten and a few millimeters or more. The stopper member 38 having the ferrite multi-layer annular structure shown in FIGS. 5 and 6 is interposed between those coupling apparatuses 16-1 and 16-2.

The magnetic induction coupling apparatus 16-2 on the reader/writer side has the same structure as that of the magnetic induction coupling apparatus 16-1 on the side of the tool holder 10.

It is now assumed that current is flowed through the induction coils 24-2 and 26-2 provided for the coupling apparatus 16-2 on the reader/writer side. First, as shown by broken lines, almost all of magnetic fluxes are generated from the inside induction coil 24-2 excluding partial leakage fluxes pass through the central ferrite cylinder 44 and intermediate ferrite pipe 42 and then pass through the magnetic core 18-1 of the opposite holder side, thereby enabling the induction coil 24-2 on the reader/writer side and the induction coil 24-1 on the holder side to be strongly magnetically coupled.

This magnetic coupling is also similarly performed with respect to the induction coil 26-2 wound to the outside of the magnetic induction coil 24-2. Namely, as shown by solid lines, almost all of the magnetic fluxes are generated by the induction coil 26-2 excluding partial leakage fluxes pass through the intermediate ferrite pipe 42 and outer peripheral ferrite pipe 40 and then pass through the magnetic core 18-1 of the magnetic induction coupling apparatus 16-1 on the opposite holder side, thereby enabling the induction coils 26-2 and 26-1 to be strongly magnetically coupled.

The magnetic fluxes are attenuated only in the portions of a gap $l_1$ on the holder side and a gap $l_2$ on the reader/writer side. By limiting the sum $(l_1+l_2)$ of these gap distances to a value of, e.g., 4 mm or less, data can be written or read out by a contactless coupling between the magnetic induction coupling apparatuses 16-1 and 16-2 through the stopper member 38.

Further, as will be obvious from FIGS. 7 and 8, the stopper member 38 is attached to each of the racks 36-1, 36-2, 36-3, ... of the automatic tool changer. When the automatic tool changer operates, the stopper member 38 moves together with the tool holder. On the other hand, since the magnetic induction coupling apparatus 16-2 on the reader/writer side is fixed, when the stopper member 38 on the holder side has moved just over the fixed magnetic induction coupling apparatus 16-2 on the reader/writer side, it is sufficient to write or read data into or from the memory module on the holder side. The data writing/reading operations can be also performed after the movement of the tool holder was once stopped or during the movement of the tool holder.

Since the foregoing embodiment has been described with respect to an example of the stopper member 38 for the magnetic induction coupling apparatuses 16-1 and 16-2 using the disc-shaped magnetic cores 18-1 and 18-2, this example relates to an example in the case where the circular pipes of the shapes according to the magnetic pole surface shapes of the cores 18-1 and 18-2 are arranged so as to have a multi-layer annular structure. However, since the similar performance can be obtained even when the shapes of the magnetic cores 18-1 and 18-2 of the magnetic induction coupling apparatus are polygon such as a rectangle, an ellipse, or the like, the stopper member can be also formed in a polygonal shape such as a rectangle or the like, or an elliptical shape in accordance with the shapes of the cores.

In the foregoing embodiment, ferrite has been used as a cylindrical or rod shaped magnetic material which forms the stopper member and plastics have been used as a nonmagnetic material to fill the space between the cylindrical magnetic materials. However, the invention is not limited to these materials. The stopper members can be also formed by use of a proper ferromagnetic material and a nonmagnetic material.

What is claimed is:

1. An automatic tool changer comprising:
a rack means for releasably holding at least one tool holder;
at least one tool holder releasably held in said rack means, said at least one tool holder including an outer flange having a positioning groove therein, a first magnetic induction coupling apparatus imbedded in said tool holder and adjacent a bottom surface of said positioning groove, a memory means in said tool holder and adjacent said first magnetic induction coupling apparatus, and said memory means executable by an electromagnetic induction coupling between said first magnetic induction coupling apparatus and a second magnetic induction apparatus;

a second magnetic induction apparatus disposed externally of said at least one tool holder, and said second magnetic induction apparatus connectable to a data reading/writing device; and a stopper member, said stopper member insertable into said positioning groove of said tool holder for stopping said tool holder, magnetic coupling means on said stopper member for insertion between said first and second magnetic induction coupling apparatuses for electromagnetically induction coupling said first and second magnetic induction coupling apparatuses and for electromagnetically coupling said memory means to a data reading/writing device through said first magnetic induction coupling apparatuses, through said magnetic coupling means of said stopper member, and through said second magnetic induction device when said stopper member is inserted in said positioning groove and between said first and second magnetic induction coupling apparatuses.

2. A device as in claim 1, wherein each one of said first and second magnetic induction coupling apparatuses includes a magnetic core having first and second ends, at least one coil groove in said first end of each said magnetic core, and an induction coil wound in each one of said at least one coil groove, and said magnetic coupling means of said stopper member includes a multilayer annular structure, said multilayer annular structure has a rod-like magnetic material core and a plurality of cylindrical magnetic material members coaxially aligned with and enclosing said rod-like magnetic material core, and the shape of said rod-like magnetic material core and the shapes of said plurality of cylindrical magnetic material members correspond to the magnetic pole surface shapes of each said magnetic core of said first and second magnetic induction coupling apparatuses.

3. A device as in claim 2, wherein said magnetic core of said first and second magnetic induction coupling apparatuses has a circular, elliptic, or rectangular magnetic pole surface shape.

4. A device as in claim 2, wherein a nonmagnetic material is disposed between said rod-like magnetic material core and said plurality of cylindrical magnetic material members and between adjacent ones of said plurality of cylindrical magnetic material members.

* * * * *